(12) United States Patent
Dalvi et al.

(10) Patent No.: US 9,376,906 B2
(45) Date of Patent: Jun. 28, 2016

(54) DOWNHOLE CABLE SENSOR

(71) Applicant: Schlumberger Technology Corporation, Sugar Land, TX (US)

(72) Inventors: Nikhil Dalvi, Sugar Land, TX (US); Edward Harrigan, Richmond, TX (US)

( * ) Notice: Subject to any disclaimer, the term of this patent is extended or adjusted under 35 U.S.C. 154(b) by 421 days.

(21) Appl. No.: 13/722,971

(22) Filed: Dec. 20, 2012

(65) Prior Publication Data
US 2014/0174725 A1 Jun. 26, 2014

(51) Int. Cl.
*E21B 47/00* (2012.01)
*G01V 11/00* (2006.01)

(52) U.S. Cl.
CPC .............. *E21B 47/00* (2013.01); *G01V 11/002* (2013.01)

(58) Field of Classification Search
CPC ... E21B 2023/008; E21B 47/00; E21B 47/01; E21B 47/12; E21B 47/0006; G01V 3/18; G01V 3/34; G01V 11/002
See application file for complete search history.

(56) References Cited

U.S. PATENT DOCUMENTS

| | | | | |
|---|---|---|---|---|
| 2,604,526 A * | 7/1952 | Basham et al. | .......... | 340/870.34 |
| 2,925,251 A * | 2/1960 | Arps | ....................... | E21B 47/12 116/137 R |
| 3,402,601 A * | 9/1968 | Heineman | ........... | E21B 47/0006 73/862.392 |
| 3,761,863 A * | 9/1973 | Straus | ............................ | 439/320 |
| 3,917,230 A * | 11/1975 | Barron | .......................... | 254/270 |
| 3,942,373 A * | 3/1976 | Rogers | ............................ | 73/152.56 |
| 4,265,110 A * | 5/1981 | Moulin | ............................ | 73/152.59 |
| 4,269,063 A * | 5/1981 | Escaron | ..................... | G01L 1/22 73/152.59 |
| 4,928,764 A * | 5/1990 | Roessler | ............... | E21B 17/028 166/113 |
| 5,062,048 A * | 10/1991 | Coulter et al. | .................... | 702/6 |
| 5,351,531 A * | 10/1994 | Kerr | ........................... | 73/152.54 |
| 5,375,476 A * | 12/1994 | Gray | ..................... | E21B 47/065 73/152.56 |
| 5,559,294 A * | 9/1996 | Hoium et al. | .............. | 73/862.44 |
| 6,233,746 B1 | 5/2001 | Skinner | | |
| 6,553,825 B1 * | 4/2003 | Boyd | ....................... | E21B 44/00 73/152.43 |
| 6,598,859 B1 * | 7/2003 | Kureck et al. | ................. | 254/292 |
| 6,662,645 B2 * | 12/2003 | Brewer | ............... | E21B 47/0006 73/152.48 |
| 6,796,191 B1 * | 9/2004 | Boyd | ....................... | E21B 44/00 73/862.321 |
| 7,793,712 B2 * | 9/2010 | Yamate et al. | ................ | 166/65.1 |
| 7,894,297 B2 * | 2/2011 | Nutt | ........................ | E21B 31/18 166/301 |
| 8,024,957 B2 * | 9/2011 | McKee | ........................... | 73/1.15 |
| 8,631,882 B1 * | 1/2014 | Keast | ................................ | 175/40 |
| 8,939,039 B2 * | 1/2015 | Ratcliffe et al. | ......... | 73/862.627 |
| 2002/0124640 A1 * | 9/2002 | Brewer | ............... | E21B 47/0006 73/152.49 |
| 2005/0096846 A1 * | 5/2005 | Koithan et al. | .................... | 702/6 |
| 2005/0194185 A1 * | 9/2005 | Gleitman | ........................ | 175/45 |
| 2008/0216554 A1 | 9/2008 | McKee | | |
| 2009/0090555 A1 | 4/2009 | Boone et al. | | |

(Continued)

OTHER PUBLICATIONS

International Search Report & Written Opinion issued in PCT/US2013/073278 on Mar. 18, 2014; 13 pages.

*Primary Examiner* — Jennifer H Gay

(57) ABSTRACT

A method and apparatus for evaluating the subterranean formation of a wellbore includes conveying a downhole tool in a wellbore via a cable, and determining the torque in the cable in real-time. The method further involves conveying the downhole tool on a wireline, and automatically triggering an alert when the torque reaches a certain level. The apparatus includes a cable, a downhole tool attached to the cable for conveyance within the wellbore, and a sensor to measure torque in the cable. The apparatus may also include a telemetry system to communicate the torque data to the surface. The downhole tool includes a sensor to measure the relative torque between the downhole tool and the cable in real time.

16 Claims, 4 Drawing Sheets

(56) References Cited

U.S. PATENT DOCUMENTS

| | | |
|---|---|---|
| 2009/0194275 A1* | 8/2009 | Bissonnette et al. ..... 166/250.01 |
| 2010/0006279 A1* | 1/2010 | Martinez et al. ................ 166/53 |
| 2011/0214477 A1* | 9/2011 | Gray et al. ...................... 73/1.09 |
| 2011/0253447 A1 | 10/2011 | Gleitman |
| 2011/0292384 A1 | 12/2011 | Ramos et al. |
| 2012/0279322 A1* | 11/2012 | Ratcliffe et al. ......... 73/862.627 |
| 2012/0304758 A1* | 12/2012 | Kumar ...................... 73/152.55 |
| 2013/0081803 A1* | 4/2013 | Tao et al. ..................... 166/247 |
| 2013/0160995 A1* | 6/2013 | Ocalan et al. ............ 166/250.01 |
| 2013/0213129 A1* | 8/2013 | Kumar et al. .............. 73/152.47 |
| 2014/0041865 A1* | 2/2014 | Paulk et al. .............. 166/250.01 |
| 2014/0166266 A1* | 6/2014 | Read ..................... E21B 47/122 166/250.01 |
| 2014/0174725 A1* | 6/2014 | Dalvi et al. ............. 166/250.01 |
| 2014/0260592 A1* | 9/2014 | Mason et al. .............. 73/152.59 |
| 2014/0326510 A1* | 11/2014 | Wessel .................. E21B 34/14 175/61 |
| 2015/0027736 A1* | 1/2015 | Smaardyk ........... E21B 47/0006 166/381 |

* cited by examiner

DOWNHOLE CABLE SENSOR

BACKGROUND

Wellbores are generally drilled into the ground or ocean bed to recover natural deposits of oil and gas, as well as other desirable materials that are trapped in geological formations in the Earth's crust.

In various oil and gas exploration operations, it may be beneficial to have information about the subsurface formations that are penetrated by a wellbore. For example, certain formation evaluation schemes include measurement and analysis of the formation pressure and permeability. These measurements may be useful in predicting the production capacity and production lifetime of the subsurface formation. Evaluating and/or measuring properties of encountered formations, formation fluids, and/or formation gasses may also be beneficial. An example property is the phase-change pressure of a formation fluid, which may be a bubble point pressure, a dew point pressure and/or an asphaltene onset pressure depending on the type of fluid. In some cases, a drillstring is removed and a wireline tool deployed into the wellbore to test, evaluate, and/or sample the formation(s), formation gas (es), and/or formation fluid(s).

Until a couple of decades ago, most of the wells drilled were vertical. Gravity and weight bars in the tool strings helped convey wireline (WL) tools rather easily in these wells. Today, the search for hydrocarbons has undergone a quantum leap in terms of the profile of the wells. Multilaterals and horizontal wells are being drilled to boost oil recovery from the same reservoir. The technology required to convey tools in such wells has had to catch up to meet the growing needs of the industry. Tractors, Coil Tubings, High Strength Cables and TLC (Tough Logging Conditions) are now used to convey tools in such ultra-deep and extended reach wells. But these challenging environments posed even bigger challenges for conveyance operations. The cables saw increased torque, not just while tractoring in horizontal wells, but also in ultra-deep vertical wells. Previously, tension and compression in the cables were the only two parameters monitored in real time. But one other parameter, cable torque, is often not measured or monitored during the entire operation.

BRIEF DESCRIPTION OF THE DRAWINGS

A better understanding of the various disclosed system and method embodiments can be obtained when the following detailed description is considered in conjunction with the drawings, in which.

DETAILED DESCRIPTION

Figure 1:
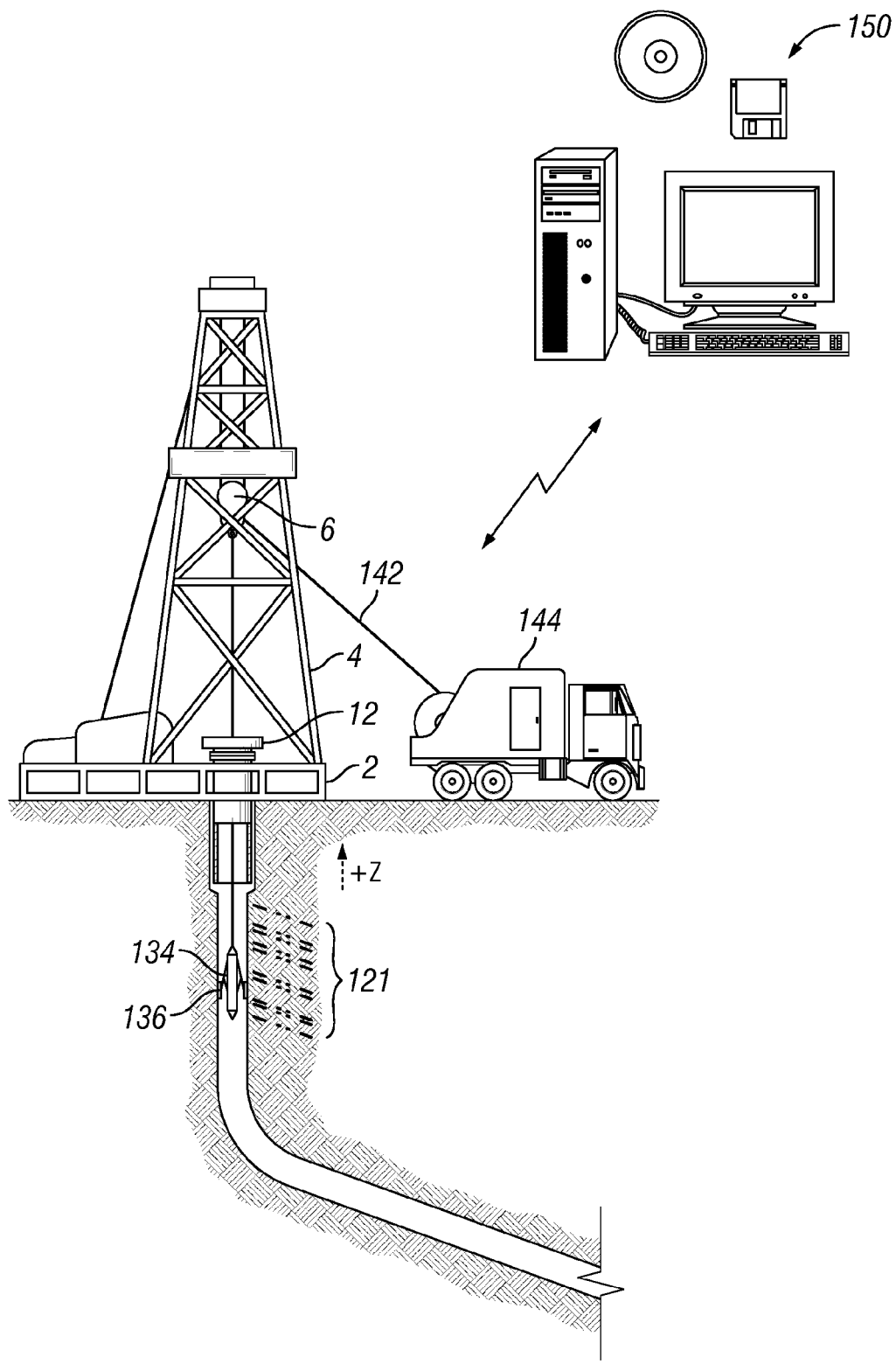
FIG. 1 is an illustrative, cable conveyance environment in accordance with one or more embodiments.

The following discussion is directed to various embodiments of the presented subject matter. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

To further assist the reader's understanding of the disclosed systems and methods, environments for their use and operation are described. Accordingly, an illustrative cable conveyance environment is shown in FIG. 1, which shows a formation 121 and a borehole that may extend either or both vertically or at an angle to vertical such as in directional drilling operations. A platform 2 is equipped with a derrick 4 that supports a hoist 6 for lowering and raising an apparatus in the borehole. The apparatus includes a cable 142 extendable into the wellbore 20 through a wellhead 12. The apparatus also includes a downhole tool 134, e.g., a logging tool such as a sensing instrument sonde, suspended by the cable 142. The cable 142 may be, for example, a wireline cable having conductors for transporting power and/or control signals to the tool and telemetry from the tool to the surface. For the example of the logging tools, a resistivity imaging portion of the downhole tool 134 may have centralizing arms 136 that center the tool 134 within the borehole as the tool is pulled uphole. For the example of a logging tools, a logging facility 144 collects measurements from the downhole tool 134, and includes computing facilities 150 for processing and storing the measurements gathered by the downhole tool 134. The computing facility can also include a display mechanism for an operator to monitor. FIG. 1 shows a formation 121 that is not perpendicular to the borehole, a situation that may occur naturally or may occur due to directional drilling operations. Wireline operations are used to determine characteristics of a borehole.

Figure 2:
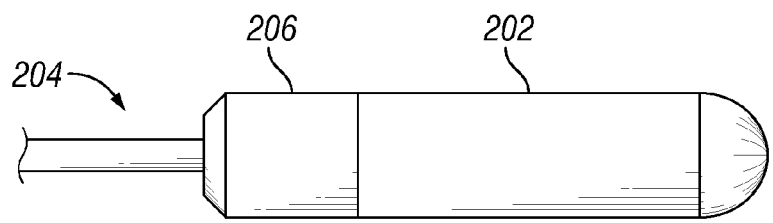
FIG. 2 illustrates an example downhole tool in which embodiments of the downhole system can be implemented.

FIG. 2. shows an illustrative embodiment of a downhole tool 202 attached to a cable 204 for conveyance in a wellbore. Attaching the downhole tool 202 with the cable is a sensor 206 to measure relative torque between the downhole tool 202 and the cable 204 in real-time. The sensor 206 or the downhole tool 202 is also capable of taking other measurements such as tension, compression, and downhole temperature in real-time.

The sensor or load cell 206 may be any suitable sensor for measuring torque. For example, the sensor 206 may include a strain gauge with a Wheatstone bridge arrangement arranged so as to measure relative torque between the cable 204 and the downhole tool 202. The bridge is arranged along the length of the tool 202. With no load on the load cell 206, the diagonally opposite nodes in the Wheatstone bridge show the same resistance. The bridge is said to be completely balanced under this condition. As the torque on the cable increases or decreases, the load cell receives and/or detects torque. This results in a change in resistance across the opposite nodes of the bridge. This change in resistance is then later correlated to load in pounds by a processor in the sensor 206 or the downhole tool 202. For example, the processor may include a digital telemetry cartridge (not shown).

As an example configuration, the downhole tool 202 can include an intermediate housing 203 and a lower housing 201, where the sensor 206 is keyed into the lower housing 201 and held fixed into the intermediate housing 203 via screws 207. The lower housing 201 of the downhole tool 202 is free to twist about the z-axis relative to the intermediate housing 203. This will cause a twisting motion to be exerted on the sensor 206 that can be measured to determine torque.

In this embodiment, the sensor 206 is arranged to measure torque in the cable 204. For example, the sensor 206 may include a Wheatstone bridge rotated by 45 degrees to measure torque. As an example, the sensor 206 may be housed in, or integral with, the downhole tool 202, where the cable 204 experiences the maximum amount of torque. Alternatively, the sensor 206 may be located in a cable head used for attaching the downhole tool 202 to the cable 204. Further, the downhole tool 202 and/or the sensor 206 may include the capability of measuring cable torque and downhole temperature. The measured temperature may be used to calibrate the torque measurements from the sensor 206. In other embodiments, the sensor 206 includes the capability of measuring cable torque, tension, compression, and downhole temperature all in real-time.

Monitoring torque seen by the cable 204 will assist an operator in reducing field maintenance cost of cables. Over a period of time, enough data about the exposure of the cable to different torque values for different time period will be obtained. This data may be used to map future cable servicing and replacement intervals. Monitoring cable torque in real-time with the sensor 206 will also help an operator in reducing the need for excessive cable de-torquing trips downhole, and reduce the risk of cable damage. The sensor 206 will allow an operator to monitor the torque level constantly over time. Some embodiments can include an alarm mechanism to alert the operator when the torque in the cable 204 reaches a certain level or threshold. For instance, during operation, the operator can be notified by an alarm via logging facility 144 when the torque sensor 206 measures torque at a certain threshold that could possibly lead to cable failure. Alternatively, the operator can be notified visually via computing facility 150. Once notified, the operator is allowed time to slow down or cease conveyance.

The apparatus may also include a telemetry system to communicate measured data from the downhole tool 202 to the computing facility 150 or a display device at the surface. For example, the downhole tool 202 may include a telemetry subsystem (not shown) that allows the tool 202 to communicate with a surface computing facility 150 that is located at the earth surface from which the wellbore extends. The telemetry system may also include the use of an Enhanced Digital Telemetry Cartridge (EDTC). The EDTC correlates the change in resistance across opposite nodes of the bridge to loads in pounds. This is how the load cell measures tension and compression in the cable. The telemetry system transfers this data to the surface.

Figure 3:
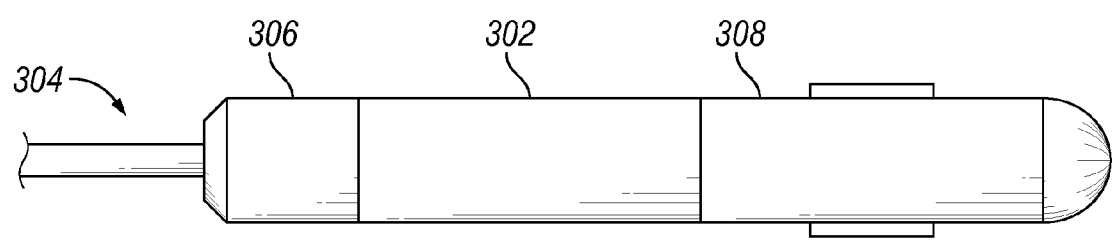
FIG. 3 illustrates another example downhole tool in which embodiments of the system can be implemented.

FIG. 3 shows another illustrative embodiment of a downhole tool 302 attached to a cable 304 for conveyance in a wellbore. However, this embodiment illustrates a downhole tool 302 with a sensor 306 and a tractor 308. The tractor 308 has the ability to arrange itself as to be able to move itself within an open or cased borehole. The tractor 308 is used to pull the downhole tool 302, sensor 306, and cable 304 into the borehole, without being gravity dependent. The tractor 308 is most useful in deviated and horizontal wells where gravity is insufficient for conveyance, as shown in FIG. 1. The tractor 308 is able to apply force against the side of the wellbore either through the use of wheels or through an "inchworm-like" motion. The tractor 308 can be operated by any suitable means, such as being hydraulically powered and can be attached to the bottom of the cable for the purpose of pulling the cable along the horizontal section of the well. The tractor device 308 used in this embodiment can be of any sort.

Figure 4:
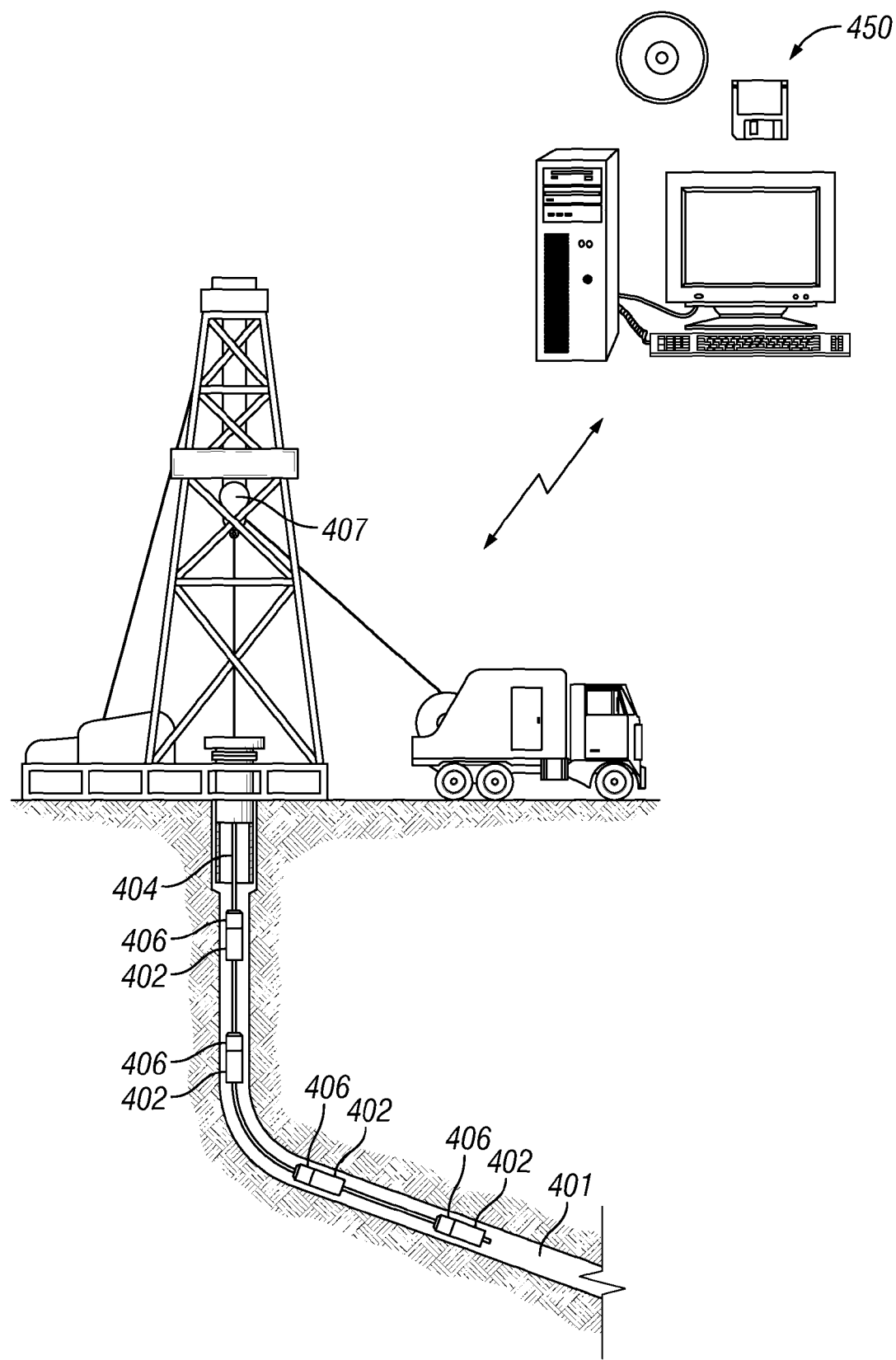
FIG. 4 illustrates an example system in which embodiments of the system can be implemented.

FIG. 4 illustrates another example apparatus in which torque in a cable 404 can be measured. The cable 404 is lowered into a deviated well 401 with a hoist 407, as shown. The well can be lined with steel casing cemented in place to the formation, However, it is within contemplation of the subject embodiment to have an open-hole portion of the wellbore as well. In this embodiment, the apparatus includes multiple downhole tools 402 attached by multiple cables 404. The cables 404 can also include an electronics cartridge for controlling the conveyance apparatus. Sensors 406 may be included with each of the downhole tools 402. The downhole tools 402 may, for example, be logging tools with one or more logging sensors that perform the functions of the downhole tool described above in FIGS, 2 and 3. However, in the embodiments shown in FIG, 4, sensors 406 measure torque in each portion of the cable 404 This ensures that monitoring is done on all parts of cable 404 to avoid cable failure. The cables 404 may, for example, be a wireline that can be used for transmitting power and control signals from the surface of the well to the downhole tools 402, and data telemetry from the tool to the surface. At the surface, data can be transmitted, processed, and stored in a data control system 450. Tractors (as shown in FIG. 3) can be part of the logging tool 402 to assist with movement along vertical and non-vertical portions of the well.

Figure 5:
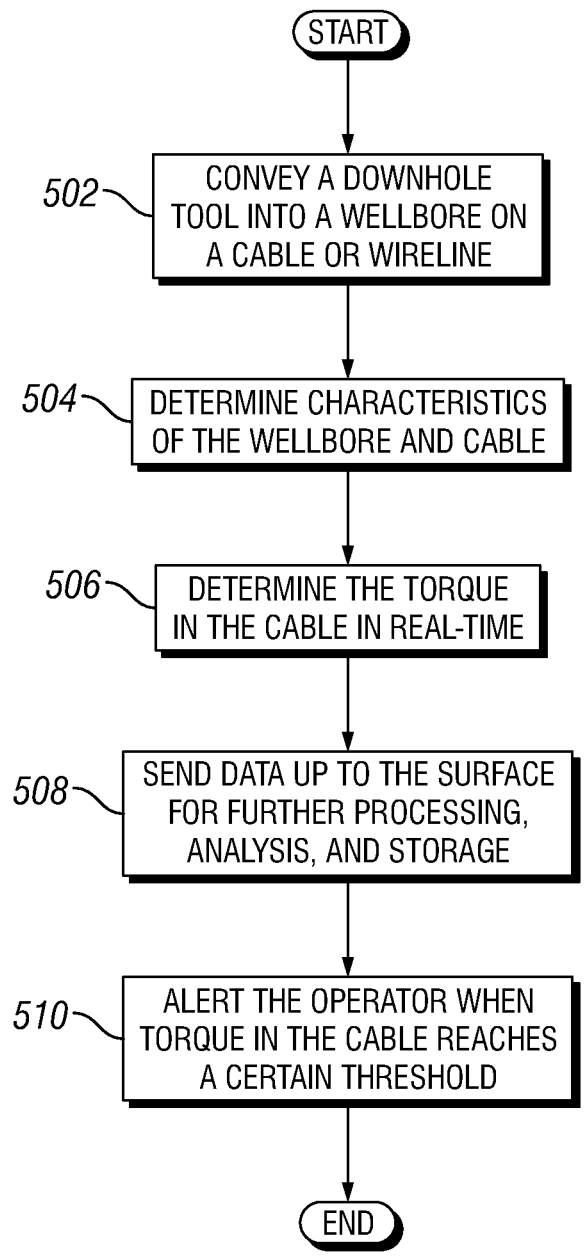
FIG. 5 is an illustrative, chart that displays example methods for the downhole system in accordance with one or more embodiments.

FIG. 5 illustrates example methods for the use of the apparatus in accordance with one or more embodiments. The illustrative flow diagram shows an example method for conveying a tool (or multiple tools) in a wellbore using a cable and measuring the torque in the cable. In block 502, the downhole tool is conveyed into a wellbore via a cable, which may be a wireline, The embodiment of the method shown in FIG. 5 is done using a wireline logging system, as shown in FIG. 1. In block 504, wellbore characteristics are determined.

These characteristics include, but are not limited to, pressure, temperature, resistivity, permeability, etc. In block 506, torque is measured and monitored in the cable. Measurements are taking by the torque sensors that are located in the logging tool. Torque measurements are taken in real-time. Measurements are also monitored in the cable such as compression and tension, as these features also play a role in cable failure. For example, tension and torque may be monitored and adjusted with respect to each other in the sense that the amount of torque a cable may be able to withstand may depend on the amount of tension in the cable. Additionally, if there is torque in the cable, a minimum tension value may need to be kept in the cable to prevent the cable from collapsing due to the torque, the equivalent of allowing the ends of a twisted rubber band to come together. Appropriate adjustments to the tension in the cable may be made. In block 508, data is sent up to the surface for further processing and/or storing. Alternatively, data can measured and sent to an operator. Finally, in block 510, an operator can be alerted during tractoring when the torque in the cable reaches a certain level. This last portion of the method is beneficial in order to avoid cable failure during operation. Although described in portions, it should be appreciated that the sensors in the apparatus may be used to measure and/or calculate torque, tension, and temperature in real time thoughout the entire conveyance in the wellbore, whether travelling into or being pulled out of the wellbore.

Although only a few example embodiments have been described in detail above, those skilled in the art will readily appreciate that many modifications are possible in the example embodiments without materially departing from the presented subject matter. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. An apparatus for conveyance within a wellbore extending into a subterranean formation, comprising:
    a cable;
    a downhole tool attached to the cable, wherein the downhole tool comprises an intermediate housing and a lower housing, wherein the lower housing is configured to twist relative to the intermediate housing, and wherein the cable is connected with the intermediate housing; and
    a sensor keyed into the lower housing and connected with the intermediate housing by one or more screws, wherein the sensor measures the twisting force applied thereto due to twisting between the intermediate housing and lower housing.

2. The apparatus of claim 1, further comprising a processor to receive the torque measurement and compute a torque in the cable.

3. The apparatus of claim 2, further comprising:
    wherein the cable is a wireline; and
    a telemetry system to communicate the wireline torque data to the surface.

4. The apparatus of claim 1, further comprising a tractor to convey the downhole tool in the wellbore.

5. The apparatus of claim 1, wherein the torque sensor comprises a load cell including a strain gauge.

6. The apparatus of claim 5, further comprising a processor configured to correlate a change in resistance in the strain gauge to load.

7. The apparatus of claim 1, wherein the downhole tool comprises a logging tool string.

8. The apparatus of claim 1, further comprising a sensor to measure at least one of temperature and tension in the cable.

9. The apparatus of claim 1, further comprising more than one downhole tool, more than one cable, and more than one sensor to measure torque in the cables.

10. A method, comprising:
    conveying a downhole tool in a wellbore extending into a subterranean formation on a cable; and
    determining the torque in the cable in real time while the downhole tool is being conveyed, wherein the torque is measured using a sensor keyed into a lower housing and connected with an intermediate housing by one or more screws.

11. The method of claim 10, further comprising conveying the downhole tool on a wireline.

12. The method of claim 10, further comprising communicating the torque to the surface in real time while the downhole tool is being conveyed.

13. The method of claim 10, further comprising automatically triggering an alert when the torque crosses a threshold value.

14. The method of claim 10, further comprising conveying the downhole tool into the wellbore with a tractor.

15. The method of claim 10, further comprising performing logging measurements with the downhole tool.

16. The method of claim 10, further comprising determining tension in the cable in real time while the downhole tool is being conveyed.

* * * * *